United States Patent
Bonner

(10) Patent No.: US 7,204,945 B2
(45) Date of Patent: Apr. 17, 2007

(54) DIRECT COUPLING OF MELT POLYMERIZATION AND SOLID STATE PROCESSING FOR PET

(75) Inventor: Richard Gill Bonner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 61 days.

(21) Appl. No.: 10/663,856

(22) Filed: Sep. 16, 2003

(65) Prior Publication Data

US 2005/0056961 A1  Mar. 17, 2005

(51) Int. Cl.
*B29C 67/00* (2006.01)

(52) U.S. Cl. .............. 264/143; 264/5; 264/12
(58) Field of Classification Search .......... 264/5, 264/12
See application file for complete search history.

(56) References Cited

U.S. PATENT DOCUMENTS

| | | | |
|---|---|---|---|
| 4,123,207 A | 10/1978 | Dudley | |
| 4,447,325 A | 5/1984 | Pauley | |
| 4,500,271 A | 2/1985 | Smith | |
| 4,565,015 A | 1/1986 | Hundley, III | |
| 4,728,276 A | 3/1988 | Pauley et al. | |
| 5,059,103 A | 10/1991 | Bruckmann et al. | |
| 5,310,515 A | 5/1994 | Jürgen et al. | |
| 5,403,176 A | 4/1995 | Bruckmann et al. | |
| 5,540,868 A * | 7/1996 | Stouffer et al. | 264/13 |
| 5,638,606 A | 6/1997 | Bryan et al. | |
| 6,138,375 A | 10/2000 | Humphries, II | |
| 6,237,244 B1 | 5/2001 | Bryan et al. | |
| 6,551,087 B1 | 4/2003 | Martin | |
| 6,858,167 B2 * | 2/2005 | Matthaei et al. | 264/9 |
| 2002/0171159 A1 | 11/2002 | Matthaei et al. | |

OTHER PUBLICATIONS

Copy of International Search Report PCT/US04/27248 filed Aug. 23, 2004.

* cited by examiner

*Primary Examiner*—Edmund H. Lee
(74) *Attorney, Agent, or Firm*—Dennis V. Carmen; Bernard J. Graves, Jr.

(57) ABSTRACT

Strands of molten polyethylene terephthalate (PET) from a PET polycondensation reactor are solidified, pelletized, and cooled only to a temperature in the range of 50° C. to a temperature near the polymer Tg by contact with water. The still hot pellets are conveyed, optionally followed by drying to remove water, to a PET crystallizer. By avoiding cooling the amorphous pellets to room temperature with water and cool air, significant savings of energy are realized.

48 Claims, 3 Drawing Sheets

DIRECT COUPLING OF MELT POLYMERIZATION AND SOLID STATE PROCESSING FOR PET

BACKGROUND OF THE INVENTION

1. Field of the Invention

The present invention pertains to the commercial manufacture of polyethylene terephthalate ("PET") polymers.

2. Background Art

PET has numerous uses, principle among which are for films, fibers, and food containers. Despite the stringent matrix of properties required for such uses, particularly for food packaging, some PET has become a commodity polymer. Commercial production of PET is energy intensive, and therefore even relatively small improvements in energy consumption are of considerable commercial value.

The production of PET (inclusive of copolymers) begins with an esterification step where the dicarboxylic acid component, predominantly terephthalic acid, is slurried in ethylene glycol and heated to produce a mixture of oligomers of a low degree of polymerization. This "esterification" step may be followed by a further "oligomerization" or "prepolymer" step, where a higher degree of polymerization is obtained. The product still has a very low molecular weight at this stage.

The previously described steps are then followed by a polycondensation. The polycondensation is catalyzed by metal compounds such as Sb, Ti, Ge, Sn, etc. Polycondensation occurs at relatively high temperature, generally in the range of 280–300° C., under vacuum, water and ethylene glycol produced by the condensation being removed. The polymer at the end of polycondensation has an inherent viscosity generally in the range of 0.4 to 0.65, corresponding to a molecular weight too low for many applications.

Commercial production of PET polyesters has required a subsequent post-polymerization in the solid state, termed "solid stating." In this stage of the process, the PET granules are heated in inert gas, preferably nitrogen, at temperatures below the melt temperature, i.e. from 210–220° C. in many cases. Solid stating is complicated by the fact that most PET polymers, following extrusion from the melt and pelletizing, are substantially amorphous. In order to prevent the pellets from sintering and agglomerating in the solid stater, the pellets are first crystallized over a period of 30 to 90 minutes at a lower temperature, e.g. 160–190° C., typically in a flow of inert gas or air. It should be noted that "solid stating" herein refers to the solid state polycondensation per se, and not to the combined processes of crystallization and solid state polycondensation. These procedures are well known to those skilled in the art, as evidenced by U.S. Pat. Nos. 5,597,891 and 6,159,406.

In the conventional PET process, the polymer is extruded directly from the polycondensation reactor into strands. The hot, extruded strands are contacted with cool water prior to chopping into pellets, dried, and stored into silos prior to crystallizing. Conventional pelletizing processes as well as a pelletizing process wherein strands are stretched prior to pelletizing are disclosed in U.S. Pat. No. 5,310,515. Conventional wisdom dictates that at least the surface of the pellets must be cooled to 20° to 30° C. to avoid sintering during storage. During storage, heat from the hotter interior of the pellets is distributed throughout the pellets. Thus, warm pellets, i.e. pellets whose exterior is significantly higher than 20–30° C. might agglomerate during storage following temperature equilibration. In addition to the decrease in temperature brought about by contact with water, the pellets can be further cooled to the desired temperature with cool air or nitrogen. The pellets are stored, and then subsequently reheated to the desired crystallization temperature. These steps of heating, cooling, and reheating entail a significant energy penalty in an already energy intensive process.

SUMMARY OF THE INVENTION

In the present invention, PET pellets from the polycondensation reactor are cooled only to a temperature below the glass transition temperature of the particular polymer or copolymer, and at or above 50° C., and held within this temperature range up to entry into the crystallizer. Despite the higher temperature of the feed pellets, agglomeration does not occur.

DETAILED DESCRIPTION OF THE PREFERRED EMBODIMENT(S)

Figure 1:
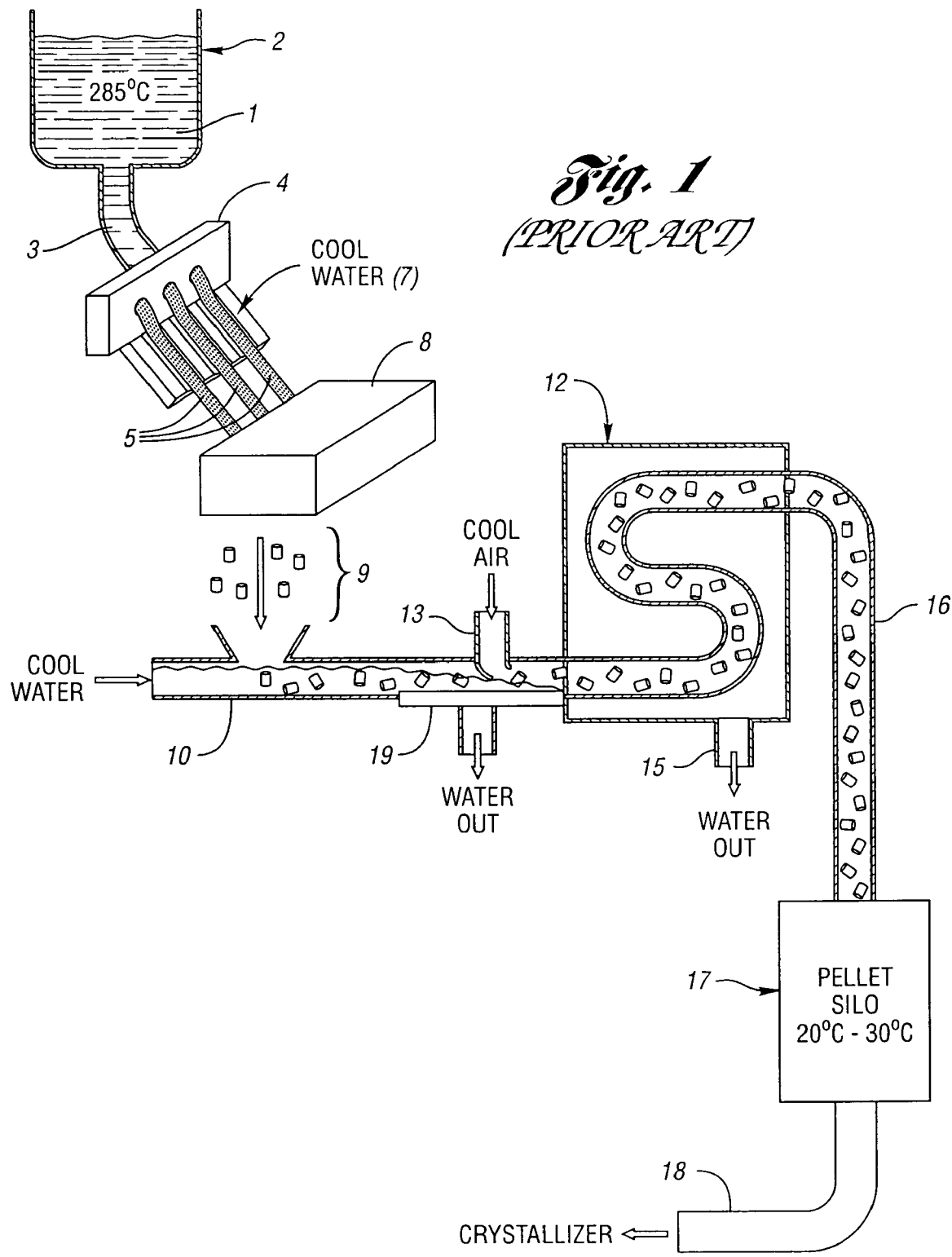
FIG. 1 illustrates the prior art process of PET production from polycondensation through solid stating.

The esterification, oligomerization, and other process steps up to and including polycondensation may be performed conventionally or by any process where pellets are produced from a polymerization melt. The improvement provided by the subject invention takes place during and/or following pelletization, and through the crystallization stage.

The PET polymers are conventional, and are polymers prepared from terephthalic acid and ethylene glycol. While dimethylterephthalate may in principle be used as well as terephthalic acid, use of the latter is preferred. In addition, the PET polymers may contain up to 20 mol percent, preferably up to 10 mol percent, and more preferably no more than 5 mol percent of dicarboxylic acids other than terephthalic acid, and the same mol percentages of glycols (diols) other than ethylene glycol.

Examples of other suitable dicarboxylic acids which may be used with terephthalic acid are isophthalic acid, phthalic acid, naphthalene dicarboxylic acids, cyclohexane dicarboxylic acids, aliphatic dicarboxylic acids, and the like. This list is illustrative, and not limiting. In some cases, the presence of minor amounts of tri- or tetracarboxylic acids may be useful for generating branched or partially crosslinked polyesters. Isophthalic acid and naphthalene dicarboxylic acids are the preferred dicarboxylic acid when mixtures of acids are employed.

Examples of diols other than ethylene glycol which may be employed include, but are not limited to, 1,2-propane diol (propylene glycol), 1,3-propane diol (trimethylene glycol), diethylene glycol, triethylene glycol, dipropylene glycol, 1,4-butane diol, 1,6-hexanediol, cyclohexane diol, neopentyl glycol, and cyclohexanedimethanol. Preferred glycols other than ethylene glycol include diethylene glycol, and most preferredly, cyclohexanedimethanol ("CHDM"), the latter generally used as a mixture of isomers. In addition, polyols such as pentaerythritol, glycerine, and trimethylolpropane may be used in most minor quantities when branched or partially crosslinked polyesters are desired.

Most preferably, only difunctional carboxylic acids and difunctional hydroxyl-functional compounds (glycols) are employed. The subject invention process is also applicable to other polyesters wherein pellets formed from the melt are amorphous.

In the description which follows, reference to equipment such as extruders, pelletizers, mechanical dryers, crystallizers, and to the process steps performed therein, are conventional unless indicated otherwise. Pelletizers are available commercially from firms such as Reiter Automatic Apparate-Maschinenbau GmbH, Germany, and Gala Industries, Eagle Rock, Va. Pelletizers, for example, are described in U.S. Pat. Nos. 4,123,207; 4,500,271; 4,728,276; 5,059,103; 5,310,515; 5,403,176; and 6,551,087; while a variety of mechanical dryers are disclosed in U.S. Pat. Nos. 4,447,325; 4,565,015; 5,638,606; 6,138,375; and 6,237,244. All foregoing patents are incorporated herein by reference.

A conventional PET process is shown in FIG. 1. In FIG. 1, the PET polymer 1 is polycondensed in the melt at about 285° C. in polycondensation reactor 2. The polymer is pumped through outlet 3 to extrusion die 4 through which the molten polymer, still very hot, exits as a plurality of strands 5. Below the die may be a grooved plate 6, the extruded strands following the grooves. Cool water 7 is directed over the strands and the plate, cooling the strands rapidly, e.g. to a surface temperature in the range of 75° to 150° C., following which the strands enter a pelletizer 8, which chops the strands into pellets 9 several mm in length. The still warm pellets fall into a moving stream of cool water, generally at 20° C. to 30° C., in conduit 10, which conveys them to a mechanical separator 19, i.e. a screen, and by air supplied through line 13 or by mechanical means, into dryer 12.

The dryer 12 may be any type of dryer, such as those supplied by Reiter or Gala. Paddle dryers, serpentine dryers, centrifugal dryers, and the like may all be used. In FIG. 1 is shown a serpentine dryer having an "S-shaped" serpentine passageway of foraminous material. The moist pellets are directed through the dryer by the air stream, water and water vapor escaping through the foraminous walls of the passageway. Water and water vapor exit the dryer through exit 15, and the cool and substantially dry pellets exit the dryer 12 through exit 16 and enter storage silo 17. Eventually, the pellets are conveyed from the storage silo through conduit 18 to a crystallizer where they are at least partially crystallized. It should be noted that pellets, due to their transit to the dryer in cool water, are already at a relatively low temperature, and are further lowered in temperature in the dryer, typically to the range of 20° C. to 30° C. on the pellet surfaces. Subsequent to crystallization, the pellets are typically conveyed to a solid stating reactor where further polycondensation to a higher inherent viscosity takes place in the solid state. However, the present invention is also useful in processes where solid state polymerization is not performed.

Figure 2:
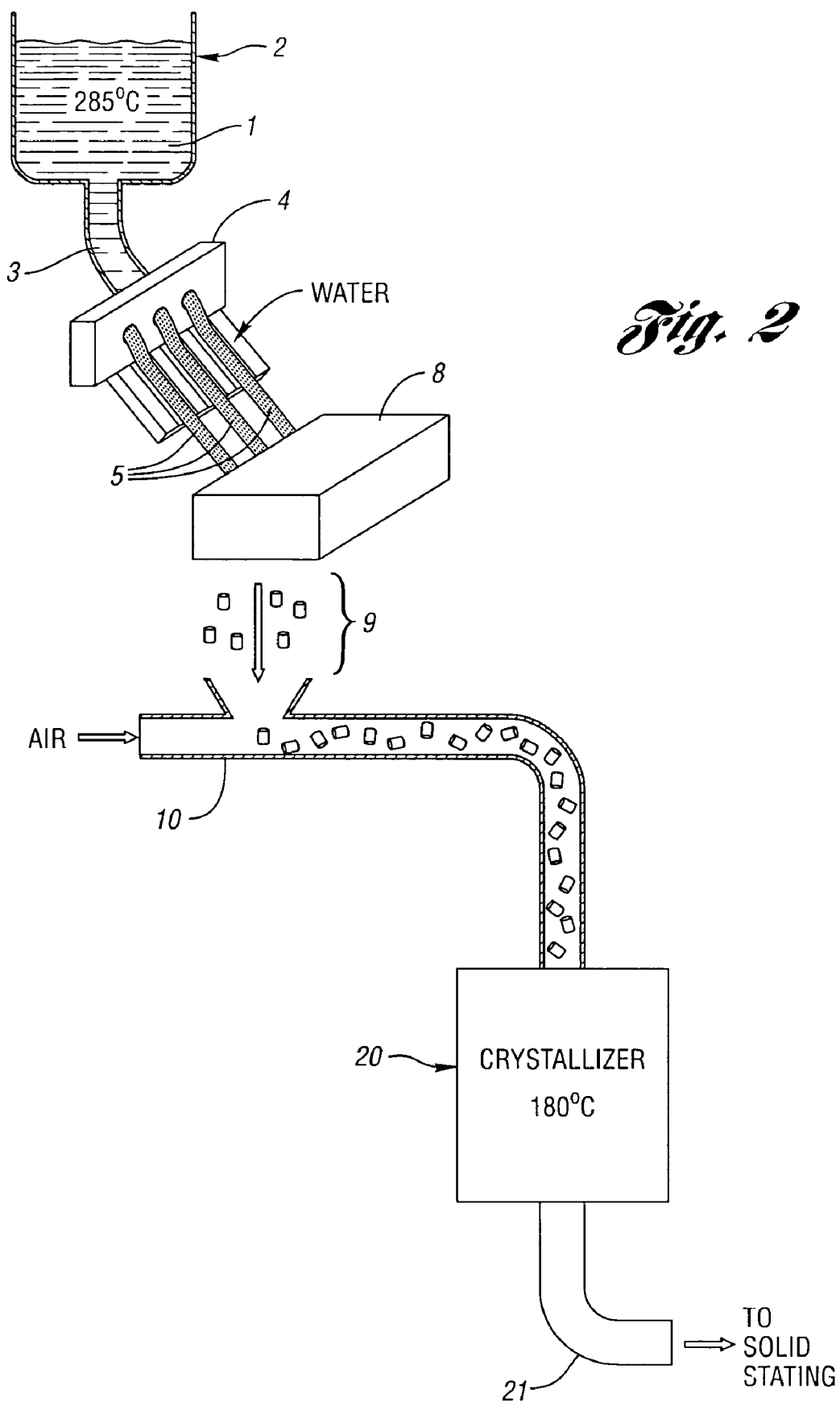
FIG. 2 illustrates one embodiment of a subject invention PET process from polycondensation through solid stating.
Figure 3:
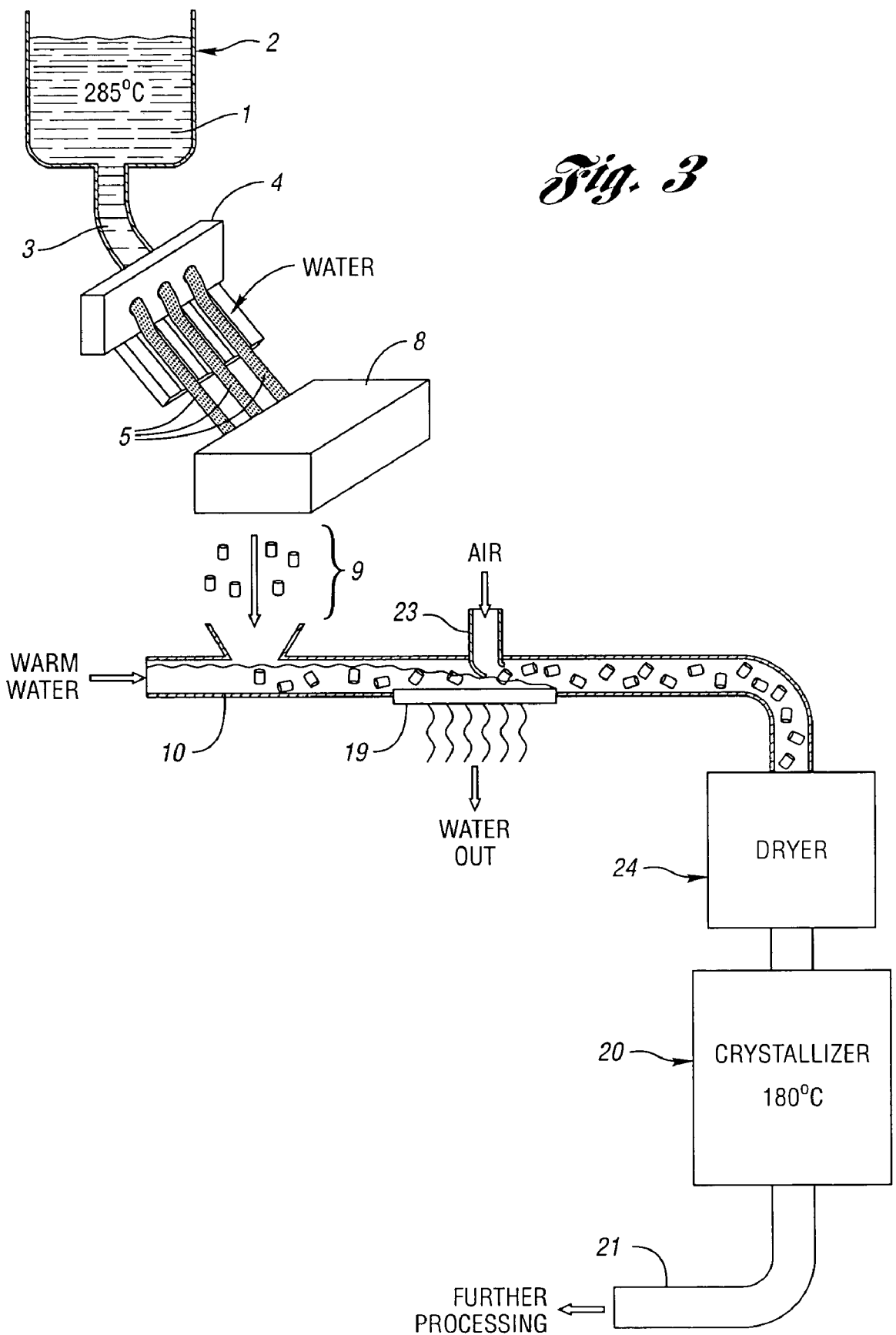
FIG. 3 illustrates yet another embodiment for the subject invention.

Embodiments of the present invention are shown in FIGS. 2 and 3. In FIG. 2, the process of FIG. 1 is followed, except that water contacting the strands, instead of cooling the strands substantially, cools them, for example, only to about 70° C.–90° C., or a temperature near the glass transition temperature ("Tg") of the polymer. This temperature may even be above the Tg, since no intermediate storage is necessary, and the temperature will decrease somewhat, preferably to below the Tg, in the air conveying stream to the crystallizer. The temperature, for example, may be 120° C. These pellets are termed "warm pellets" herein. The warm pellets are conveyed, i.e. by an air stream, preferably directly to the crystallizer. Since the pellets are still quite warm, any water present on the pellets will rapidly evaporate, either during transit, or upon initial entry into the crystallizer, which generally operates at temperatures above 160° C. at ambient or reduced pressure, and generally in conjunction with a stream of inert gas. It is preferable that the pellets remain warm, i.e. close to or above a minimum temperature of 50° C. upon entry into the crystallizer, preferably about 90° C.

Thus, as illustrated by FIG. 2, in one embodiment of the subject invention process, the strands 5 are contacted with water 7, i.e. warm water or a limited quantity of cooler water, and optionally air, prior to pelletization in the pelletizer 8. The pellets are then conveyed by air through conduit 10 directly into the crystallizer 20 where they are crystallized under conventional conditions, i.e. 160°–190° C. in a flow of inert gas or air, following which they exit the crystallizer through conduit 21 and are thus directed to the solid stating reactor, when the latter is used.

FIG. 3 represents a preferred embodiment wherein warm water is used to transport the pellets 9 past dewatering screen 19, and wherein air through air inlet 23 directs the pellets directly to crystallizer 20, or through optional dryer 24 and then to crystallizer 20, exiting the crystallizer through conduit 21 to the optional solid stating reactor. Water collected from the dewatering screen 19 is preferably recirculated and used as water 7 to initially cool the strands, and/or as the warm transport water supply to conduit 10. If full or partial drying of the pellets is desired, as described as an embodiment in FIG. 3, the pellets may be introduced into a dryer prior to being conveyed to the crystallizer. However, the air flow into the dryer is such that while substantial water is removed, the pellets remain at a relatively high temperature, i.e. about 70–90° C. It should be noted that any type of dryer can be used with the subject invention process, and any type of crystallizer. Since the crystallizer operates at relatively high temperature and itself is capable of volatizing relatively large amounts of water, the dryer may be of relatively small size. From the dewatering screen, the wet pellets may constitute 40–60% by weight of water. Much of this water can be removed by a simple dryer, i.e. a centrifugal dryer of relatively small size, and the moist pellets, now containing much less water, e.g. 5 to 15% water, are then introduced into the crystallizer.

Due to the relatively high temperature of the molten polyester strands as they exit the polycondensation reactor, there is an abundance of thermal energy in the overall process which may be used, e.g. to heat air necessary for transport of dry, wet, or moist pellets, or as a feed to the crystallizer. It is important to remember that it is desired to keep the pellet temperature as high as possible but preferably near or below the polymer Tg, and in any case, higher than 50° C. The higher the pellet temperature at the crystallizer inlet, the greater the heat savings, and the more economical the process becomes. The subject invention process has the benefit that a substantial portion of the energy penalty for cooling the pellets and subsequently reheating them does not occur.

In the present invention, the water which contacts the pellets will be either a small quantity of cool water whose temperature rapidly rises and is insufficient to cool the pellets substantially below the Tg of the polymer, or a larger quantity of warm water which has the same effect. The water supply is preferably recirculated, and excess heat may be removed in a heat exchanger. The excess heat may be used in other portions of the overall process. Preferably, the water temperature is from 40° C. to 70° C., more preferably 50° C. to 70° C., and most preferably 50° C. to 60° C.

The water which contacts the pellets may be supplied in total during initial cooling of the hot strands of molten PET. In this case, the temperature of the pellets, both exterior and interior, is preferably somewhat above the polymer Tg to aid in pelletizing. Instead of entering a stream of cool water, the pellets may be contacted with an air stream, which further cools the surface of the pellets to a temperature below the Tg, for example but not by limitation, to a temperature in the range of 70° to 90° C. The air may be recirculated if desired, which will ordinarily assure that the air stream remains warm.

Alternatively, as in FIG. 3, a water stream may be used to transfer the pellets to the crystallizer, for example with a water separator positioned prior to the crystallizer as is now customary prior to entry into the storage silo where pellets are stored prior to entry into the crystallizer. However, in the case of the subject invention, cool water cannot be used in this embodiment. Rather, warm water having a temperature of about 50° C. or more is preferably used. The water temperature may be lower than 50° C. when the distance of transport prior to removal of water, or the velocity of the conveying water stream, or both, are such that a short transit time does not allow pellet temperature to drop below the desired range. This water is preferably recirculated following separation of water from the pellets, optionally also augmented with hot water vapor which exits the crystallizer, such that little if any heat will be required to maintain the water temperature. Preferably, no additional heat is required.

In the present invention, the pellets are fed directly to the crystallizer, and in the embodiment illustrated in FIG. 3, intermediately and optionally through a dryer. It is thus preferred that transport to the crystallizer be substantially continuous, without bulk storage in a silo which is the current practice. However, it would not depart from the spirit of the invention to employ a holding stage which temporarily disrupts the continuous flow. Such a holding stage, when employed, will be of much smaller size than a storage silo, and would only have the effect of delaying the continuous flow to the crystallizer.

It should be understood that when pellet temperature is referred to in the claims, this temperature is the temperature of the exterior of the pellets. If the exterior temperature is above the Tg of the polymer for substantial portions of time following pelletization, the pellets may exhibit agglomeration, particularly when flowing in an air stream to the crystallizer. The exterior temperature may be measured by any convenient method. One suitable method is to take a fresh sample of pellets and insert them in an insulated vessel with one or preferably a plurality of rapid reacting temperature probes, and plotting the temperature versus time. Extrapolation backwards in time will give the temperature of the exterior of the pellets, as at "zero" time, no heat will have been diffused from the pellet interior. However, since heat conduction through the polymer is relatively slow, simple measurement of the temperature of a small bulk sample will provide an excellent approximation to the exterior temperature, and may be used for that purpose herein. In the case where warm water is used to transport the pellets, the pellet exterior temperature may be assumed to be the same as the water temperature at the pellet/water separation point.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for decreasing energy usage in a polyethylene terephthalate production process comprising
    a) solidifying a molten polyethylene terephthalate to form amorphous polyethylene terephthalate pellets and cooling the pellets to a temperature from about 50° C. to about the Tg of the polyethylene terephthalate to form warm polyethylene terephthalate pellets; and
    b) conveying said warm polyethylene terephthalate pellets to a crystallizer, wherein the temperature of the warm polyethylene terephthalate pellets is in the range of about 50° C. to below the $T_g$ of the polyethylene terephthalate at an inlet of the crystallizer.

2. The process of claim 1, wherein said step of conveying comprises introducing said warm pellets into a stream of water having a temperature of between about 50° C. and 90° C.

3. The process of claim 2, wherein prior to said step of introducing said warm pellets into said crystallizer, water is removed from said warm polyethylene terephthalate pellets.

4. The process of claim 3, wherein water is removed prior to or during said step of conveying.

5. The process of claim 3, wherein water is removed by means of a foraminous screen.

6. The process of claim 3, wherein water is removed in a mechanical dryer.

7. The process of claim 5, wherein water is removed in a mechanical dryer.

8. The process of claim 2, wherein said warm pellets have a temperature in the range of 70° C. to 90° C. at the inlet to said crystallizer.

9. The process of claim 2, wherein said stream of water comprises water recirculated from a water removal step.

10. The process of claim 6, wherein no heat energy is added to said dryer.

11. The process of claim 1, wherein said step of conveying comprises introducing said warm pellets from said step of pelletizing into a gas stream.

12. The process of claim 11, wherein said gas stream, prior to contact with said pellets, has a temperature in the range of 40° C. to 90° C.

13. The process of claim 11, wherein said gas stream, prior to contact with said pellets, has a temperature in the range of 50° C. to 70° C.

14. The process of claim 11, wherein prior to said step of introducing said warm pellets into said crystallizer, water from said steps of solidifying and/or pelletizing is removed from said warm polyethylene terephthalate pellets.

15. The process of claim 14 wherein said water is removed in a mechanical dryer.

16. The process of claim 11, wherein said warm pellets have a temperature in the range of 70° C. to 90° C. at the inlet to said crystallizer.

17. The process of claim 1, wherein prior to said step of pelletizing, water is removed from said solidified pellets by a blast of air.

18. The process of claim 1, wherein said warm polyethylene terephthalate pellets are conveyed from step a) to said crystallizer without intermediate storage.

19. The process of claim 1, wherein said step of conveying comprises introducing said warm pellets from step a) into a stream of water, and thereafter conveying said pellets in a stream of gas to the crystallizer.

20. A process for decreasing energy usage in a polyethylene terephthalate production process comprising:

a) solidifying a molten polyethylene terephtha late to form amorphous polyethylene terephthalate pellets and cooling the pellets to a temperature from about 50° C. to about the $T_g$ of the polyethylene terephthlate to form warm polyethylene terephthlate pellets;

b) conveying said warm polyethylene terephthlate pellets to a crystallizer, wherein the temperature of the warm polyethylene terephthalate pellets is in a range of about 50° C. to below the $T_g$ of the polyethylene terephthalate inlet of the crystallizer;

c) crystallizing said pellets in a crystallizer:
   i) over a period of 30 to 90 minutes;
   ii) at a temperature between 160° C. and 190° C.; or
   iii) both.

21. The process of claim 20, wherein the pellets are crystallized at a temperature within a range of 160° C. to 190° C.

22. The process of claim 21, wherein said step of conveying comprises introducing said warm pellets into a stream of water having a temperature of between about 50° C. and 90° C.

23. The process of claim 22, wherein prior to said step of introducing said warm pellets into said crystallizer, water is removed from said warm polyethylene terephthalate pellets.

24. The process of claim 22, wherein water is removed prior to or during said step of conveying.

25. The process of claim 22, wherein water is removed by means of a foraminous screen.

26. The process of claim 24, wherein water is removed in a mechanical dryer.

27. The process of claim 22, wherein water is removed in a mechanical dryer.

28. The process of claim 27, wherein no heat energy is added to said dryer.

29. The process of claim 22, wherein said stream of water comprises water recirculated from a water removal step.

30. The process of claim 20, wherein said warm pellets are introduced into the crystallizer at a temperature in the range of 70° C. to 90° C.

31. The process of claim 20, wherein said step of conveying comprises introducing said warm pellets from step a) into a gas stream.

32. The process of claim 31, wherein said gas stream, prior to contact with said pellets, has a temperature in the range of 40° C. to 90° C.

33. The process of claim 31, wherein said gas stream, prior to contact with said pellets, has a temperature in the range of 50° C. to 70° C.

34. The process of claim 20, wherein said warm polyethylene terephthalate pellets are conveyed from step a) to said crystallizer without intermediate storage.

35. The process of claim 20, wherein said pellets are crystallized over a period of time ranging from 30 minutes to 90 minutes.

36. The process of claim 20, wherein said pellets are crystallized over a period of time ranging from 30 minutes to 90 minutes at a temperature of 160° C. and 190° C.

37. A process for decreasing energy usage in a polyethylene terephthalate production process comprising:

a) solidifying a molten polyethylene terephthalate to form amorphous polyethylene terephthalate pellets and cooling the pellets to a temperature from about 50° C. to about the Tg of the polyethylene terephthalate to form warm polyethylene terephthalate pellets;

b) introducing the warm pellets into a stream of gas, and conveying said warm pellets in the stream of gas to a crystallizer, wherein the temperature of the warm polyethylene terephthalate pellets is in the range of about 50° C. to below the $T_g$ of the polyethylene terephthalate at an inlet of the crystallizer.

38. The process of claim 37, wherein said gas stream, prior to contact with said warm pellets, has a temperature in the range of 40° C. to 90° C.

39. The process of claim 37, wherein said gas stream, prior to contact with said warm pellets, has a temperature in the range of 50° C. to 70° C.

40. The process of claim 37, wherein said warm pellets with water are combined from the solidification in step a).

41. The process of claim 40, for the comprising removing water from the pellets prior to introducing the pellets into the crystallizer.

42. The process of claim 41, wherein said water is removed in a mechanical dryer.

43. The process of claim 42, wherein no heat energy is added to the mechanical dryer.

44. The process of claim 37, wherein said warm pellets are introduced into the crystallizer at a temperature in the range of 70° C. to 90° C.

45. The process of claim 37, wherein said warm polyethylene terephthalate pellets are conveyed from step a) to said crystallizer without intermediate storage.

46. The process of claim 37 further comprising crystallizing the warm polyethylnen terephthalate pellets at a temperature in a range of 160° C. to 190° C.

47. The process of claim 37 further comprising crystallizing the warm polyethylene terephthalate pellets over a time period between 30 minutes to 90 minutes.

48. The process of claim 37, comprising introducing the warm pellets from step a) into a stream of water, separating water from the pellets and conveying the warm pellets in the stream of gas to the crystllizer.

* * * * *